(12) United States Patent
Dalsgaard et al.

(10) Patent No.: US 11,384,730 B2
(45) Date of Patent: Jul. 12, 2022

(54) THRUST BALANCE CONTROL OF A MULTIROTOR WIND TURBINE BASED ON CONSTRAINTS

(71) Applicant: VESTAS WIND SYSTEMS A/S, Aarhus N (DK)

(72) Inventors: Søren Dalsgaard, Hadsten (DK); Jesper Lykkegaard Neubauer, Hornslet (DK); Kim Hylling Sørensen, Aarhus C (DK); Jacob Brøchner, Horsens (DK); Erik Carl Lehnskov Miranda, Randers SV (DK); Peter Bøttcher, Egå (DK); Julio Xavier Vianna Neto, Aarhus N (DK); Torben Petersen, Åbyhøj (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/956,952

(22) PCT Filed: Dec. 18, 2018

(86) PCT No.: PCT/DK2018/050375
§ 371 (c)(1),
(2) Date: Jun. 22, 2020

(87) PCT Pub. No.: WO2019/120419
PCT Pub. Date: Jun. 27, 2019

(65) Prior Publication Data
US 2020/0332765 A1    Oct. 22, 2020

(30) Foreign Application Priority Data

Dec. 20, 2017   (DK) .......................... PA 2017 70964

(51) Int. Cl.
*F03D 9/00*       (2016.01)
*H02P 9/04*       (2006.01)
(Continued)

(52) U.S. Cl.
CPC ............... *F03D 7/028* (2013.01); *F03D 1/02* (2013.01); *F03D 7/0264* (2013.01); *F03D 7/045* (2013.01);
(Continued)

(58) Field of Classification Search
CPC .......... F03D 1/02; F03D 7/0264; F03D 7/028; F03D 7/045; F03D 9/25; F03D 13/20;
(Continued)

(56) References Cited

U.S. PATENT DOCUMENTS

| 2003/0168864 A1* | 9/2003 | Heronemus | ............. F03D 13/25 290/55 |
| 2003/0170123 A1* | 9/2003 | Heronemus | ............. F03D 13/20 416/41 |

(Continued)

FOREIGN PATENT DOCUMENTS

| EP | 2565442 A1 | 3/2013 |
| EP | 2799711 A1 | 11/2014 |

(Continued)

OTHER PUBLICATIONS

Danish Patent and Trademark Office, 1st technical examination of application PA 2017 70964, dated Jun. 7, 2018.
(Continued)

*Primary Examiner* — Tulsidas G Patel
*Assistant Examiner* — Thomas K Quigley
(74) *Attorney, Agent, or Firm* — Patterson + Sheridan, LLP

(57) ABSTRACT

A method for controlling a multirotor wind turbine is disclosed. A first operational state of each of the energy
(Continued)

generating units of the wind turbine is obtained. A difference in thrust acting on at least two of the energy generating units is detected. At least one constraint parameter of the set of operational constraints is adjusted in accordance with prevailing operating conditions and in accordance with the detected difference in thrust, and a new operational state for at least one of the energy generating units is derived, based on the at least one adjusted constraint parameter, the new operational state(s) counteracting the detected difference in thrust. Finally, the wind turbine is controlled in accordance with the new operational states for the energy generating units.

20 Claims, 4 Drawing Sheets

(51) Int. Cl.
*F03D 7/02* (2006.01)
*F03D 9/25* (2016.01)
*F03D 13/20* (2016.01)
*F03D 1/02* (2006.01)
*F03D 7/04* (2006.01)

(52) U.S. Cl.
CPC ............... *F03D 9/25* (2016.05); *F03D 13/20* (2016.05); *F05B 2240/912* (2013.01); *F05B 2270/1031* (2013.01); *F05B 2270/327* (2013.01); *F05B 2270/328* (2013.01); *F05B 2270/329* (2013.01); *F05B 2270/404* (2013.01); *F05B 2270/708* (2013.01)

(58) Field of Classification Search
CPC ........ F05B 2240/912; F05B 2270/1031; F05B 2270/327; F05B 2270/328; F05B 2270/329; F05B 2270/404; F05B 2270/708

See application file for complete search history.

(56) References Cited

U.S. PATENT DOCUMENTS

| | | | |
|---|---|---|---|
| 2009/0008939 A1* | 1/2009 | Pare | ........................ F03D 13/10 290/44 |
| 2012/0051939 A1* | 3/2012 | Marvin | .................... F03D 80/85 416/244 R |
| 2013/0127173 A1* | 5/2013 | Lee | ........................ F03D 13/20 290/55 |
| 2013/0257051 A1 | 10/2013 | Spruce et al. | |
| 2017/0335821 A1 | 11/2017 | Ohya et al. | |
| 2018/0283355 A1* | 10/2018 | Miranda | ................. F03D 7/047 |

FOREIGN PATENT DOCUMENTS

| | | | | |
|---|---|---|---|---|
| WO | 2016128002 A1 | | 8/2016 | |
| WO | WO-2016128002 A1 | * | 8/2016 | ............. F03D 7/047 |
| WO | 2017108047 A1 | | 6/2017 | |
| WO | WO-2017202944 A1 | * | 11/2017 | ........... F03D 7/0224 |
| WO | WO-2018157897 A1 | * | 9/2018 | ............. F03D 17/00 |
| WO | 2019120419 A1 | | 6/2019 | |

OTHER PUBLICATIONS

PCT Written Opinion of the International Searching Authority, Application: PCT/DK2018/050375.

* cited by examiner

THRUST BALANCE CONTROL OF A MULTIROTOR WIND TURBINE BASED ON CONSTRAINTS

FIELD OF THE INVENTION

The present invention relates to a method for controlling a multirotor wind turbine, i.e. a wind turbine comprising two or more energy generating units, in the case that a difference in thrust acting on at least two of the energy generating units is present.

BACKGROUND OF THE INVENTION

When the wind acts on wind turbine blades of an energy generating unit of a wind turbine, thereby causing a rotor of the energy generating unit to rotate, this results in thrust acting on the energy generating unit.

In the case that the wind turbine is a multirotor wind turbine, i.e. in the case that the wind turbine comprises two or more energy generating units, the thrust acting on the energy generating units may not be the same. This could, e.g., be due to wind shear, notably horizontal wind shear, i.e. variations in wind speed from the position of one energy generating unit to another energy generating unit, differences in the operation of the energy generating units, no or low energy production from one of the energy generating units, e.g. due to faults or change in operation mode of a generator, etc. In any event, differences in thrust acting on the energy generating units may introduce loads in the wind turbine, notably in a supporting structure carrying the energy generating units.

WO 2016/128004 A1 discloses a control system for damping structural vibrations of a wind turbine system having multiple rotors. Control means receives vibration data associated with a support structure of the wind turbine system and determines a damping control command for a respective one of the rotors. The rotors counteract the measured vibration by adjusting a blade pitch and/or by controlling generator power. A model of structural correlations may be implemented into the control means to take into account that an actuation at one wind turbine module may have an effect at other wind turbine modules.

WO 2016/150447 A1 discloses control of a wind turbine system comprising a plurality of wind turbine modules mounted to a common support structure. A control system comprises local controllers operable to control the wind turbine modules in accordance with local control objectives and a central controller configured to monitor the operation of the wind turbine system and based thereon calculate the local control objectives.

DESCRIPTION OF THE INVENTION

It is an object of embodiments of the invention to provide a method for controlling a wind turbine comprising two or more energy generating units, in which thrust imbalance among the energy generating units is counteracted.

It is a further object of embodiments of the invention to provide a method for controlling a wind turbine comprising two or more energy generating units, in which loads on the wind turbine are reduced as compared to prior art methods.

The invention provides a method for controlling a wind turbine, the wind turbine comprising a support structure and at least two energy generating units mounted on the support structure, each energy generating unit comprising a rotor comprising a set of wind turbine blades, the energy generating units being operable within a set of operational constraints, the method comprising the steps of:

obtaining a first operational state of each of the energy generating units, detecting that a difference in thrust acting on at least two of the energy generating units is present, adjusting at least one constraint parameter of the set of operational constraints in accordance with prevailing operating conditions and in accordance with the detected difference in thrust, deriving a new operational state for at least one of the energy generating units, based on the at least one adjusted constraint parameter, the new operational state (s) counteracting the detected difference in thrust, and controlling the wind turbine in accordance with the new operational states for the energy generating units.

Thus, the invention relates to a method for controlling a wind turbine. The wind turbine comprises a support structure having at least two energy generating units mounted thereon. In the present context the term 'support structure' should be interpreted to mean a structure which is capable of carrying the energy generating units and handling the loads involved therein. The support structure may, e.g., be or comprise a conventional wind turbine tower or pylon. The energy generating units may, in this case, be mounted directly on the tower and/or the energy generating units may be mounted on one or more transversal structures, e.g. in the form of arms, connected to the tower. Alternatively, the support structure may comprise two or more separate structures, each being mounted on a foundation, and each being arranged to have one or more energy generating units mounted thereon.

Each of the energy generating units comprises a rotor comprising a set of wind turbine blades. Wind acting on the wind turbine blades thereby causes the rotor to rotate. These rotating movements are supplied to a rotating part of a generator, either directly or via a gear arrangement, and the generator produces electrical energy, which is supplied to a power grid. Accordingly, the energy generating units form the parts of the wind turbine which are actually producing electrical energy.

The energy generating units are operable within a set of operational constraints. The set of operational constraints for a given energy generating unit defines limits within which the energy generating unit must be operated. The operational constraints may, e.g., relate to various kinds of loads acting on various parts of the wind turbine, power production of the energy generating unit, etc. The set of operational constraints for a given energy generating unit may be design parameters in the sense that they define, e.g., load limits within which the wind turbine is designed to operate, with due consideration to an expected lifetime of the wind turbine.

Since the wind turbine being controlled by means of the method according to the invention comprises at least two energy generating units, the wind turbine may be referred to as a multirotor wind turbine.

According to the method of the invention, a first operational state for each of the energy generating units is initially obtained. The first operational state for a given energy generating unit is the state in which the energy generating unit is currently operating. The obtained first operational state may include information regarding various settings of the energy generating unit, such as pitch angle of the wind turbine blades, power production, yaw angle, rotational speed of the rotor, rotational speed of the generator, etc. Furthermore, the first operational state may include information regarding ambient parameters, such as wind speed, wind direction, temperature, humidity, etc., relating to the energy generating unit.

Next, it is detected that a difference in thrust acting on at least two of the energy generating units is present. The energy generating units are mounted at various positions on the support structure. In order to handle loads introduced in the wind turbine, notably in the support structure, due to thrust acting on the energy generating units, the energy generating units are normally mounted on the support structure in such a manner that when substantially equal thrust acts on the energy generating units, the forces applied by the individual energy generating units counteract each other, thereby minimising the total loads on the support structure. Accordingly, when a difference in thrust acting on at least two of the energy generating units is present, it can be assumed that additional loads are introduced in the wind turbine, notably in the support structure. This is undesirable, and it is therefore desirable to eliminate or reduce the detected difference in thrust.

The step of detecting that a difference in thrust acting on at least two of the energy generating units is present may include detecting the actual difference in thrust, or even detecting the thrust acting on each of the energy generating units. As an alternative, the step may simply include establishing that a difference in thrust is present without detecting how large this difference is.

The detected difference in thrust may be due to a number of different root causes. For instance, the difference in thrust may be caused by a difference in ambient conditions, such as wind speed and/or wind direction at the positions of the energy generating units. Alternatively or additionally, the difference in thrust may be caused by differences in the operation of the energy generating units, such as one of the energy generating units operating with reduced or no power production, one of the energy generating units being in the process of switching operating mode for the generator, etc. This will be described in further detail below.

Next, at least one constraint parameter of the set of operational constraints is adjusted. This is done in accordance with prevailing operating conditions and in accordance with the detected difference in thrust. For instance, during yawing it may be suitable to adjust a yaw load constraint, allowing the yaw load constraint to be higher. Alternatively or additionally, during downtime of one of the energy generating units it may be suitable to broaden a range of the yaw load constraint.

Adjusting a constraint parameter could, e.g., include allowing at least one of the energy generating units to temporarily operate outside the normal constraint limits, e.g. in a manner which introduces higher loads on the wind turbine, or which results in a lower or higher total power production of the wind turbine. This may, e.g., be acceptable if it results in a reduction in the difference in thrust acting on the at least two energy generating units, which is likely to reduce the loads on the wind turbine more than the expected additional loads caused by the adjusted constraint parameter (s). Or it may be acceptable if the wind turbine has previously been operated with lower loads than the design loads, in which case the accumulated fatigue in the wind turbine may be lower than expected. This will allow the wind turbine to be temporarily operated with higher loads without affecting the expected lifetime of the wind turbine. It may also be acceptable if the higher loads are limited to a specific time interval and/or number of occurrences throughout the lifetime of the wind turbine. In this case the accumulated fatigue in the wind turbine will also be limited to a level which does not affect the expected lifetime of the wind turbine.

In any event, the adjustment of the constraint parameter(s) is performed with due consideration to the prevailing operating conditions, e.g. including prevailing wind conditions, current power production, current settings of the energy generating units, e.g. pitch angles, yaw angles, etc.

Next, a new operational state is derived for at least one of the energy generating units, based on the at least one adjusted constraint parameter. The new operational state(s) is/are selected in such a manner that the detected difference in thrust is fully or partially counteracted. Since the new operational state(s) is/are derived on the basis of the at least one adjusted constraint parameter, it is possible to select operational states which are capable of counteracting the difference in thrust, even if the consequence is that the wind turbine is temporarily operated outside the normal operating constraints.

Finally, the wind turbine is operated in accordance with the new operational states for the energy generating units. Accordingly, the wind turbine is operated in such a manner that the difference in thrust acting on the at least two energy generating units is counteracted.

In an embodiment, the new operational states may be a shutdown of each of the energy producing units. Such shutdown may be needed if the determined thrust difference is above a given threshold. A shutdown may also be effectuated by setting a constraint on the rotor speed, such that the rotor speed should be at idling level or zero.

The step of adjusting at least one constraint parameter may comprise adjusting a load constraint relating to at least one of the energy generating units. According to this embodiment, at least one of the energy generating units may be allowed to temporarily operate in a manner which introduces loads on one or more parts of the energy generating unit, which exceed the normal load constraints for this energy generating unit. This could, e.g., include adjusting load constraints relating to wind turbine blades, rotor, drive train, generator, etc. Accordingly, the step of adjusting at least one constraint parameter may comprise adjusting a load parameter of one or more parts of at least one of the energy generating units.

Alternatively or additionally, the step of adjusting at least one constraint parameter may comprise adjusting a load constraint relating to the support structure. According to this embodiment, at least one of the energy generating units may be allowed to temporarily operate in a manner which introduces loads in the support structure, which exceed the normal load constraints relating to the support structure. This could, e.g., include adjusting load constraints relating to bending moments, yaw torque, base torque, etc.

The step of adjusting at least one constraint parameter may comprise adjusting a power production constraint relating to at least one of the energy generating units. This could include increasing or decreasing a maximum allowable power production of the energy generating unit. In the case that the maximum allowable power production of the energy generating unit is increased, the energy generating unit is allowed to temporarily operate in an overrated state. This could, e.g., be used for compensating for reduced or missing power production of one or more of the other energy generating units. Such reduced or missing power production may be the cause of the detected difference in thrust acting on the at least two energy generating units.

Similarly, in the case that the maximum allowable power production of the energy generating unit is decreased, the energy generating unit is temporarily operated in a derated state.

The step of adjusting at least one constraint parameter may comprise adjusting a range and/or a setpoint for at least one constraint. The normal operational constraints may be defined in the form of ranges, within which a given constraint parameter is allowed to be and/or in the form of setpoint values which are used during control of the wind turbine.

In the case that the step of adjusting at least one constraint parameter comprises adjusting a range for at least one constraint, the upper and/or the lower limit of the range may be adjusted. For instance, the lower limit may be decreased while the upper limit is increased, thereby allowing larger fluctuations of the constraint. Alternatively, the lower limit as well as the upper limit of the range may be increased, thereby allowing the constraint to be generally higher, but without allowing larger fluctuations of the constraint. Similarly, the lower limit as well as the upper limit may be decreased, thereby allowing the constraint to be generally lower, but without allowing larger fluctuations of the constraint. Alternatively, the lower limit may be increased while the upper limit is decreased, thereby allowing smaller fluctuations of the constraint. Finally, only one of the limits may be adjusted, e.g. allowing the constraint to increase above the original upper limit, while preventing that the constraint decreases below the original lower limit, etc.

In the case that the step of adjusting at least one constraint parameter comprises adjusting a setpoint for at least one constraint, this could, e.g., include adjusting an activation threshold and/or a control setpoint for a controller of the wind turbine. For instance, a higher or a lower setpoint for a given constraint may be temporarily applied by the controller.

The step of detecting that a difference in thrust is present may comprise detecting that operation of at least one of the energy generating units has stopped. This should be interpreted to include any kind of stop in power production, such as that the rotor of the energy generating unit has been braked, e.g. due to an emergency stop of a controlled stop, that the energy generating unit is idling, and thereby not producing power, etc. Thus, in this case the difference in thrust is caused by different operational states of the energy generating units. When one of the energy generating units is stopped, the thrust acting on the stopped energy generating unit will be significantly lower than the thrust acting on any of the energy generating units which are operating normally. Accordingly, a stopped energy generating unit indicates that a difference in thrust acting on this energy generating unit and the thrust acting on at least one of the other energy generating units is present.

In a similar manner, the step of detecting that a difference in thrust is present may comprise detecting that at least one of the energy generating units is in an operational state which can not be changed. Such an operational state could, e.g., be a braked state or an idling state, as described above, but it could also be a state in which the generator is in the process of changing operating state, a start-up state, etc.

Similarly, the step of detecting that a difference in thrust is present may comprise detecting reduced power production of at least one of the energy generating units. This will also result in a decrease in thrust acting on the energy generating unit(s) with reduced power production.

When the difference in thrust is caused by different operational states of the energy generating units, as described above, the presence of the difference in thrust may, e.g., be detected by means of a signal generated by a controller of the wind turbine.

Alternatively, the step of detecting that a difference in thrust is present may comprise detecting a difference in wind conditions at the at least two energy generating units. According to this embodiment, the difference in thrust is caused by a difference in ambient conditions, in this case a difference in wind conditions, such as the wind speed and/or the wind direction at the positions of at least two of the energy generating units.

The wind speed as well as the wind direction at the position of the rotor of a given energy generating unit has an impact on the thrust acting on the energy generating unit. Thereby a difference in wind speed and/or wind direction from the position of one energy generating unit to the position of another energy generating unit indicates that a difference in thrust acting on the two energy generating units is present. A difference in wind speed could, e.g., be due to wind shear or different wake effects at the positions of the energy generating units.

A difference in wind conditions may, e.g., be detected by means of a wind speed sensor, such as an anemometer, a lidar or any other suitable kind of wind speed sensor, and/or by means of a wind direction sensor, such as a wind vane or the like. Alternatively or additionally, a difference in wind conditions may be detected by means of a wind estimator. Such a wind estimator may, e.g., use pitch angle settings, power level, driving torque, rotational speed of the rotor and/or the time derivative of the rotational speed of the rotor as input. Alternatively or additionally, databases such as $C_P$ tables or drivetrain efficiency tables may be used.

Alternatively or additionally, the step of detecting that a difference in thrust is present may comprise detecting a difference in operational state of each of the energy generating units. Thus by comparing differences in operational states, or parameters defining the operational states of the energy generating units, a difference in thrust may be determined. In an embodiment, the difference in operational state includes detecting a difference in at least pitch angle and rotor speed. From the pitch angle setting, in particular the collective pitch angle setting, and the rotor speed, the aerodynamic thrust on each rotor may be estimated, and from this estimation, a difference in thrust can be determined. The estimation may also include the produced power of each energy generating units. The difference in thrust determined in this manner, may be determined for two or more energy generating units positioned in the same horizontal plane.

As another alternative, the step of detecting that a difference in thrust is present may comprise measuring any effect of the difference in thrust in the wind turbine. For instance, a yaw moment on the support structure or on the foundation may be measured. In the case that the yaw system is a hydraulic yaw system, the hydraulic pressure in the yaw system may be measured. Furthermore, in the case that the yaw system is provided with a sliding feature, the yaw speed may be measured.

As another alternative, the support structure may comprise a main tower part extending along a substantially vertical direction and at least two arms, each arm extending away from the main tower part along a direction having a horizontal component, each arm being connected to the main tower part via a yawing mechanism, and the step of detecting that a difference in thrust is present may comprise detecting a torque on the yawing mechanism.

According to this embodiment, the presence of a difference in thrust is detected by monitoring the impact of the thrust difference on the support structure, in this case the torque on the yawing mechanism caused by the difference in thrust. This could, e.g., include detecting that the torque on the yawing mechanism exceeds a predefined threshold value, or detecting that the torque on the yawing mechanism is changing, e.g. increasing. As an alternative, other suitable kinds of loads on the support structure may be detected, such as bending moment and/or torsional loads.

According to this embodiment, the support structure comprises a main tower part and at least two arms being connected to the main tower part via a yawing mechanism. The main tower part extends along a substantially vertical direction, and it may be similar to a conventional wind turbine tower or pylon. Each of the arms extends away from the main tower part along a direction having a horizontal component. Thus, each arm extends along a direction which is not vertical, i.e. which is not parallel to the direction of the main tower part. Thereby a free end of each arm is arranged at a distance from the vertically arranged main tower part.

Each arm is preferably arranged to carry at least one of the energy generating units. Thereby the energy generating units may be arranged at a distance from the main tower part. In this case the arms and the energy generating units may advantageously be arranged in a substantially symmetrical manner with respect to the main tower part, in order to balance loads on the wind turbine. When a difference in thrust acting on at least two of the energy generating units is present, an imbalance in the loads is introduced, which may result in a torque on the yawing mechanism. Thus, when a torque on the yawing mechanism is detected, this is an indication that a difference in thrust is present.

At least two of the arms may form part of a common transversal structure, extending away from the main tower part on opposite sides of the main tower part. In this case these two arms are connected to the main tower part via a common yawing mechanism, and the two arms are yawed relative to the main tower part together and simultaneously.

The step of deriving a new operational state for each of the energy generating units may comprise specifying that at least one of the energy generating units shall operate in motor mode.

In the present context the term 'motor mode' should be interpreted to mean an operational state in which the energy generating unit consumes power instead of producing power. In this case rotation of the rotor is maintained by means of electrical power being supplied to the generator.

When the rotor is rotated in this manner, a thrust acts on the energy generating unit which is higher than if no power was supplied to the generator. This may be useful in some cases in order to counteract a difference in thrust acting on at least two of the energy generating units. Furthermore, allowing one of the energy generating units to operate in motor mode may create a situation where one or more of the other energy generating units is/are capable of increasing their energy production, thereby resulting in an increased power production of the entire wind turbine, even though one of the energy generating units consumes power.

The step of deriving a new operational state for at least one of the energy generating units may comprise adjusting at least one yaw setting of the wind turbine. According to this embodiment, the yaw setting of at least one of the energy generating units is changed when the new operational state is applied.

For instance, in the case that two of the energy generating units are mounted on two arms forming part of a single transversal structure, the rotors of the energy generating units will often be arranged at an angle with respect to each other. During normal operation the transversal structure will be yawed to a position where neither of the rotors is directly facing the incoming wind, and thereby neither of the energy generating units will be able to extract maximum energy from the incoming wind. In the case that one of the energy generating units experiences conditions which cause low power production, such as the energy generating unit being stopped or derated, the transversal structure may be yawed to a position where the rotor of the other energy generating unit directly faces the incoming wind, thereby increasing the power production of this energy generating unit and at least partly compensating for the power production loss of the stopped or derated energy generating unit.

As an alternative, at least one yaw setting may be adjusted by adjusting a yaw sliding threshold, e.g. increasing the yaw sliding threshold. This could be relevant in the case that the yaw system comprises a sliding feature in order to relieve extreme yaw loads. This may, e.g., be applied in the case that one energy generating is stopped or derated.

Alternatively or additionally, the step of deriving a new operational state may comprise adjusting a pitch setting, a rotational speed setting, and/or any other suitable kind of operational setting for at least one of the energy generating units.

The method may further comprise the step of performing an optimization calculation, optimizing total power production of the wind turbine, taking the at least one adjusted constraint parameter and the detected difference in thrust into account, and the step of deriving a new operational state for at least one of the energy generating units may further be based on the optimization calculation.

According to this embodiment, the new operational states for the energy generating units are further derived on the basis of an optimization calculation, i.e. the new operational states are selected in such a manner that the total power production of the wind turbine is optimized, given the prevailing operational constraints, when the new operational states are applied. Thereby it is ensured that the detected difference in thrust is counteracted, while an optimal power production is obtained, under the given circumstances.

The step of performing an optimization calculation may be performed using a model predictive control (MPC) algorithm. Alternatively, any other suitable algorithm from the optimal control theory may be used.

The step of performing an optimization calculation may comprise consulting a database. The database could, e.g., be in the form of a look-up table. The database may comprise information regarding operational states which provide optimal power production under various operational scenarios. Thus, when a given operational scenario is occurring, the database is consulted and the operational states providing optimal power production for the wind turbine under this operational scenario are selected. This provides a fast response time, since an actual optimization calculation need not be performed in real time. Instead, the optimization calculations may be performed offline and provided to the database in advance. Furthermore, consulting a database may be combined with an real time calculation of the optimization. For instance, a database comprising $C_P$ and/or $C_t$ tables may be consulted, and values retrieved from the database may be used during the real time calculation.

BRIEF DESCRIPTION OF THE DRAWINGS

The invention will now be described in further detail with reference to the accompanying drawings in which.

DETAILED DESCRIPTION OF THE DRAWINGS

Figure 1:
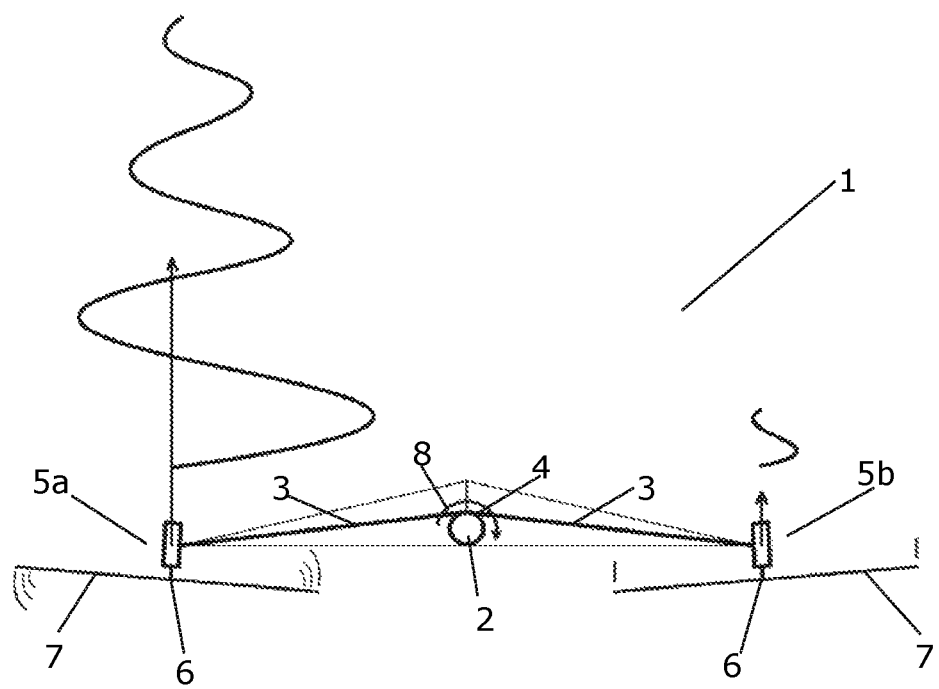
FIG. 1 is a top view of a wind turbine being controlled in accordance with a method according to an embodiment of the invention.

FIG. 1 is a top view of a wind turbine 1 being controlled in accordance with a method according to an embodiment of the invention. The wind turbine 1 comprises a support structure comprising a main tower part 2 and two arms 3 connected to the main tower part 2 via a yawing mechanism 4. The two arms 3 form part of a common transversal structure, and thereby both arms 3 are moved together relatively to the main tower part 2, via the yawing mechanism 4.

Each of the arms 3 carries an energy generating unit 5 comprising a rotor 6 with a set of wind turbine blades 7. The thrust acting on one of the energy generating units 5*a* is significantly higher than the thrust acting on the other energy generating unit 5*b*. Accordingly, a difference in thrust acting on the two energy generating units 5*a*, 5*b* is present. This results in a torque on the yawing mechanism 4 as illustrated by arrow 8. Thereby the presence of the difference in thrust can be detected by detecting the torque on the yawing mechanism 4.

The difference in thrust acting on the two energy generating units 5*a*, 5*b* may, e.g., be caused by a difference in ambient conditions, such as wind conditions. This could, e.g., include a difference in wind speed at the positions of the energy generating units 5*a*, 5*b*, e.g. due to a difference in wake effects or horizontal wind shear, etc. As an alternative, the difference in thrust acting on the two energy generating units 5*a*, 5*b* may be caused by internal control actions, such as one of the energy generating units 5*b* being stopped, idling, or operating with reduced power production.

In any event, when a difference in thrust acting on the two energy generating units 5*a*, 5*b* is detected, a new operational state for at least one of the energy generating units 5*a*, 5*b* is derived. The new operational states are selected in such a manner that the difference in thrust is counteracted.

Furthermore, the new operational states are derived with due consideration to a set of operational constraints, where at least one constraint parameter has been adjusted. Normally, the wind turbine 1 is operated within a set of operational constraints which may be selected in such a manner that the wind turbine 1 can be operated without causing damage to the wind turbine 1 and in a manner which limit fatigue in the wind turbine 1 to a level which allows a design lifetime of the wind turbine 1 to be obtained. The operational constraints may, e.g., relate to loads on various parts of the wind turbine 1, energy production, etc. The operational constraints may be defined during design of the wind turbine 1. When adjusting at least one constraint parameter of the set of operational constraints, the wind turbine 1 is allowed to temporarily operate outside the normal constraints, e.g. with higher loads on some parts of the wind turbine 1. The adjusted constraint parameter could, e.g., include an adjusted range or an adjusted setpoint value for a constraint. This will be described in further detail below with reference to FIGS. 3-5.

The wind turbine 1 is then controlled in accordance with the new operational states, and thereby the difference in thrust acting on the energy generating units 5*a*, 5*b* is counteracted. Furthermore, since the new operational states are also derived on the basis of the adjusted constraint parameters, the new operational settings may require that the wind turbine 1 is temporarily operated outside the normal operational constraints. However, this is considered acceptable as long as the new operational settings cause the difference in thrust to be counteracted, and as long as ultimate wind turbine design loads are not exceeded.

Figure 2:
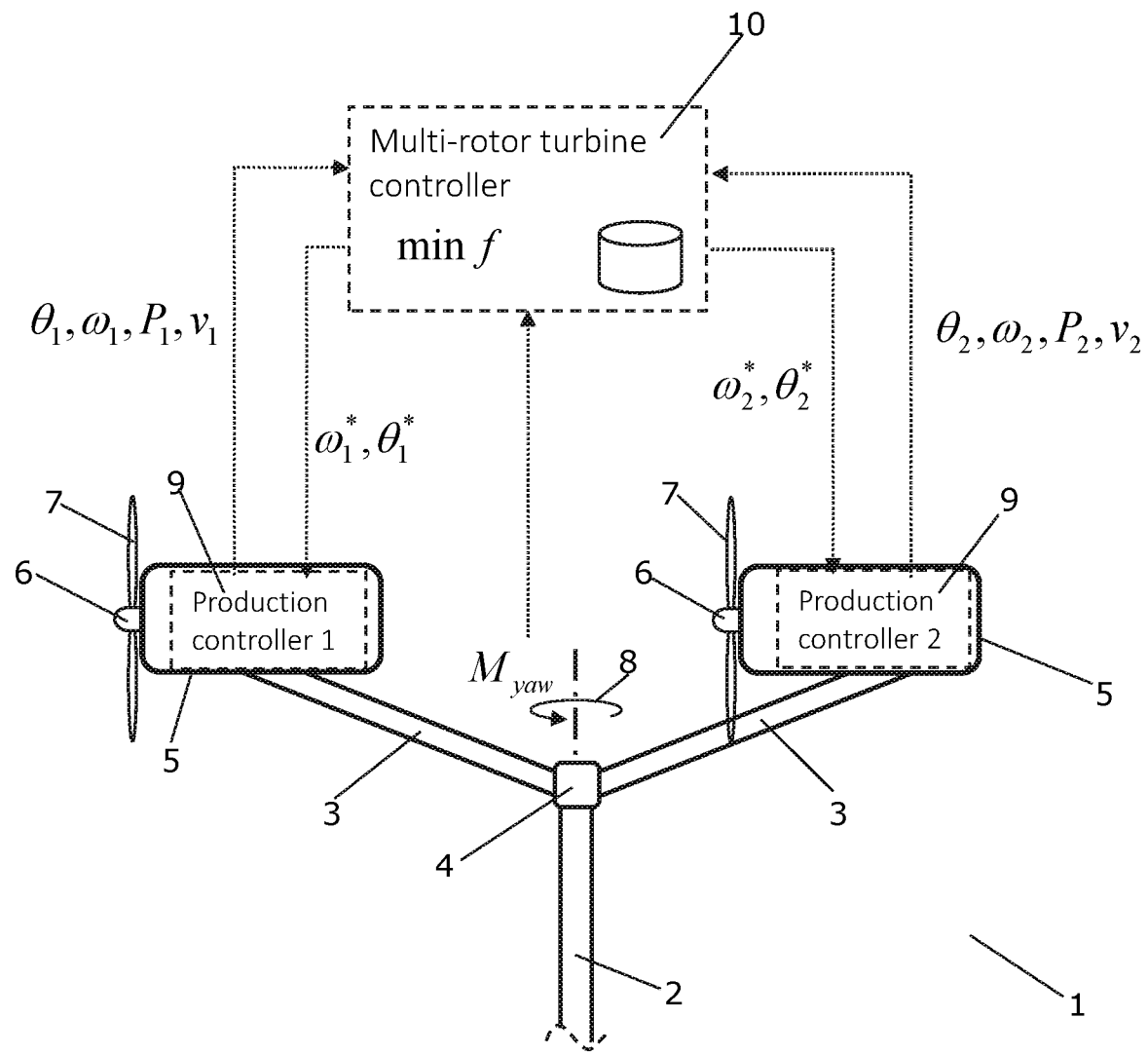
FIG. 2 is a diagrammatic view of a wind turbine being controlled in accordance with a method according to an embodiment of the invention.

FIG. 2 is a diagrammatic view of a wind turbine 1 being controlled in accordance with a method according to an embodiment of the invention. The wind turbine 1 could, e.g., be the wind turbine 1 of FIG. 1. Thus, similar to the wind turbine 1 of FIG. 1, the wind turbine 1 of FIG. 2 comprises a support structure comprising a main tower part 2 and two arms 3 being connected to the main tower part 2 via a yawing mechanism 4. Each arm 3 carries an energy generating unit 5 comprising a rotor 6 with a set of wind turbine blades 7.

Each of the energy generating units 5 comprises a production controller 9 arranged to control the operation of the corresponding energy generating unit 5. It should be noted that the production controllers 9 need not be physically arranged in the energy generating units 5, but each of the production controllers 9 is dedicated for controlling a given energy generating unit 5. Furthermore, the wind turbine 1 comprises a multirotor wind turbine controller 10 arranged to control the operation of the entire wind turbine 1, including coordinating the operation of the individual energy generating units 5.

The wind turbine 1 of FIG. 2 may be operated in the following manner. During normal operation, the production controllers 9 of each of the energy generating units 5 forward their operational states to the multirotor wind turbine controller 10. The operational states include pitch angle, $\theta$, rotational speed of the rotor, $\omega$, power production, P, and wind speed, v.

At a certain point in time, a torque, $M_{yaw}$, as indicated by arrow 8, on the yawing mechanism 4 is detected and reported to the multirotor wind turbine controller 10. This is considered as an indication that a difference in thrust acting on the energy generating units 5 is present. Accordingly, the multirotor wind turbine controller 10 adjusts at least one constraint parameter of the set of operational constraints which are normally applied, and derives a new operational state for at least one of the energy generating units 5. The new operational states are derived in such a manner that the detected difference in thrust acting on the energy generating units 5 is counteracted, and in such a manner that the at least one adjusted constraint parameter is taken into account, i.e. an operational state which causes the wind turbine 1 to be operated outside the normal set of operational constraints but within the adjusted set of constraints, can be selected. The new operational states may further be derived in such a manner that an optimal power production of the wind turbine 1 is obtained, given the prevailing operating conditions and the adjusted set of operational constraints.

In the embodiment illustrated in FIG. 2, a new operational state in the form of new settings for the rotational speed of the rotor, $\omega$, and the pitch angle, $\theta$, is forwarded to the production controller 9 of each of the energy generating units 5.

Finally, the energy generating units 5 are controlled in accordance with the new operational states received from the multirotor wind turbine controller 10.

Figure 3:
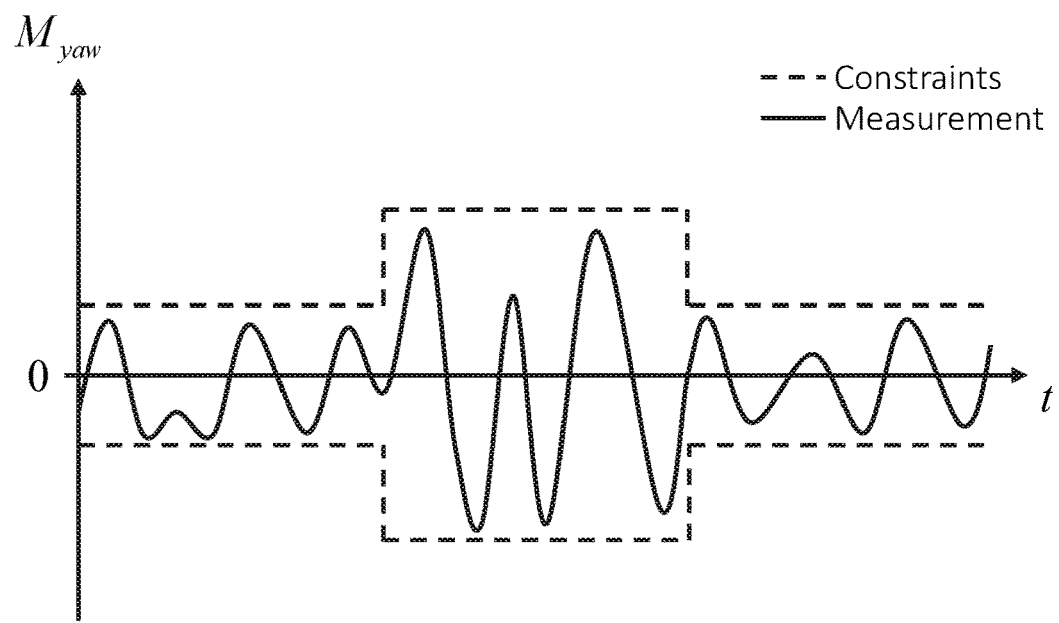
FIGS. 3-5 illustrate adjustment of various constraint parameters.

FIG. 3 is a graph showing a torque, $M_{yaw}$, on a yawing mechanism of a multirotor wind turbine as a function of time, t. An operational constraint in the form of a range within which the torque, $M_{yaw}$, is allowed to be, is illustrated as dashed lines, indicating upper and lower limits of the range.

Constraint parameters in the form of the upper limit of the range and the lower limit of the range are adjusted for a limited time interval. This is done in such a manner that the upper limit is temporarily increased and the lower limit is temporarily decreased. Thereby the torque, $M_{yaw}$, is allowed to fluctuate more than normally, but the mean value of the torque, $M_{yaw}$, is not changed.

Figure 4:
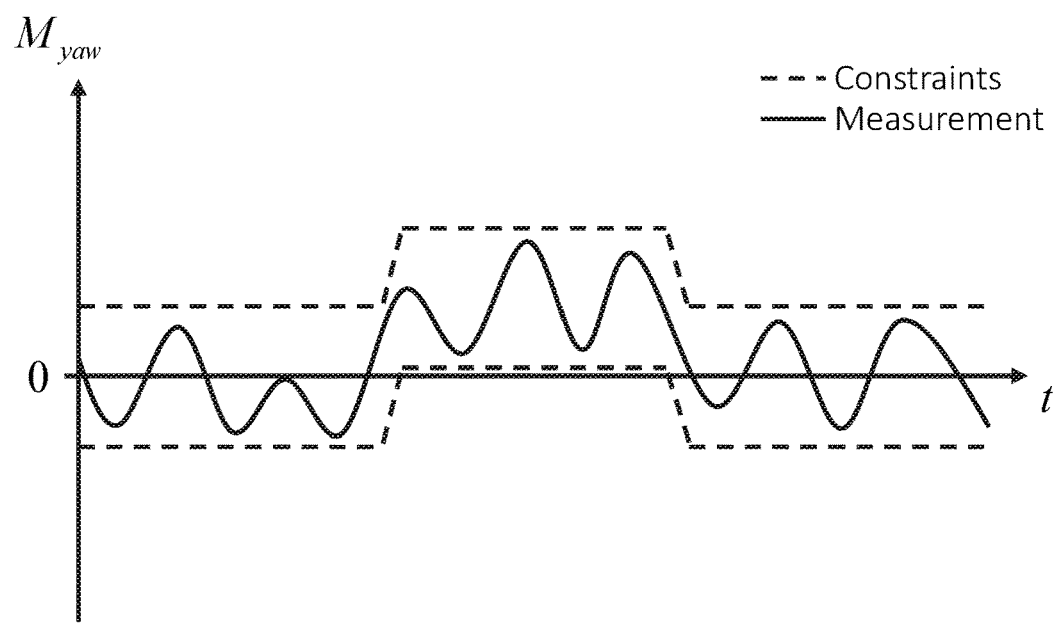

FIG. 4 is also a graph showing a torque, $M_{yaw}$, on a yawing mechanism of a multirotor wind turbine as a function of time, t. Also in FIG. 4, an operational constraint in the form of a range within which the torque, $M_{yaw}$, is allowed to be, is illustrated as dashed lines, indicating upper and lower limits of the range.

However, in FIG. 4 the adjustment of the constraint parameters is performed in such a manner that the upper limit of the range as well as the lower limit of the range is increased. Thereby the torque, $M_{yaw}$, is not allowed to fluctuate more than normally, but the torque, $M_{yaw}$, is generally allowed to be at a higher level than normally.

Figure 5:
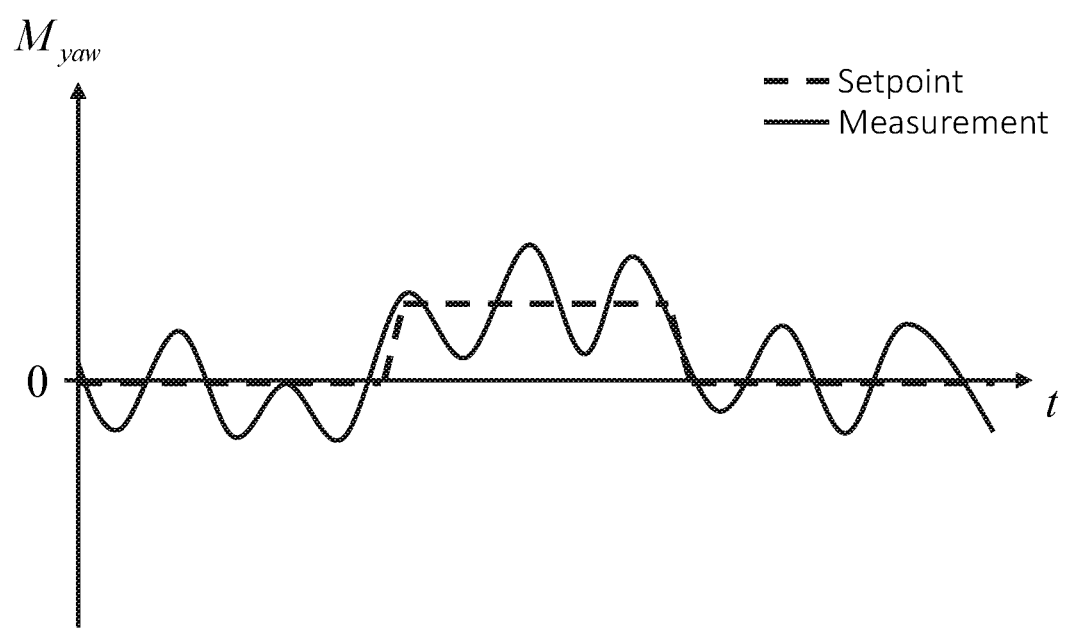

FIG. 5 is also a graph showing a torque, $M_{yaw}$, on a yawing mechanism of a multirotor wind turbine as a function of time, t. In FIG. 5 a constraint in the form of a setpoint value for the torque, $M_{yaw}$, is illustrated as a dashed line.

A constraint parameter in the form of the setpoint value is adjusted for a limited time interval, by temporarily increasing the setpoint value. Accordingly, the wind turbine is temporarily controlled in accordance with a higher torque, $M_{yaw}$, on the yawing mechanism.

The invention claimed is:

1. A method for controlling a wind turbine having a plurality of energy generating units mounted on a support structure, each of the plurality of energy generating units having a rotor comprising a set of wind turbine blades, the method comprising:
while each energy generating unit of the plurality of energy generating units operates in a respective first operational state of a plurality of predefined operational states:
applying a respective first set of operational constraints defining limits for one or more operational parameters of the respective energy generating unit;
detecting a difference in thrust acting on at least two energy generating units of the plurality of energy generating units;
adjusting, for at least one energy generating unit of the plurality of energy generating units, at least one operational constraint of the respective first set of operational constraints in accordance with prevailing operating conditions and with the difference in thrust, wherein adjusting the at least one operational constraint allows the at least one energy generating unit to temporarily operate outside the limits for the one or more operational parameters, thereby increasing loads on the support structure of the wind turbine; and
selecting, based on the adjusted at least one operational constraint, a respective second operational state of the plurality of predefined operational states for the at least one energy generating unit; and
operating the at least one energy generating unit in the respective second operational state to thereby counteract the difference in thrust.

2. The method of claim 1, wherein the adjusting at least one operational constraint comprises:
adjusting a load constraint relating to the at least one energy generating unit.

3. The method of claim 1, wherein the adjusting at least one operational constraint comprises:
adjusting a load constraint relating to the support structure.

4. The method of claim 1, wherein the adjusting at least one operational constraint comprises:
adjusting a power production constraint relating to the at least one energy generating unit.

5. The method of claim 1, wherein the adjusting at least one operational constraint comprises:
adjusting a range or a setpoint for the at least one operational constraint.

6. The method of claim 1, wherein the detecting the difference in thrust comprises:
detecting that operation of one of the at least two energy generating units has stopped.

7. The method of claim 1, wherein the detecting the difference in thrust comprises:
detecting a difference in wind conditions at the at least two energy generating units.

8. The method of claim 1, wherein the detecting the difference in thrust comprises:
detecting a difference in operational state of the at least two energy generating units.

9. The method of claim 8, wherein detecting the difference in the operational state comprises:
detecting a difference in at least one of pitch angle or rotor speed.

10. The method of claim 1,
wherein the support structure comprises:
a main tower part extending along a substantially vertical direction;
a yawing mechanism; and
at least two arms connected to the main tower part via the yawing mechanism, each arm extending away from the main tower part along a direction having a horizontal component, and
wherein detecting the difference in thrust comprises detecting a torque on the yawing mechanism.

11. The method of claim 1, wherein the selecting the respective second operational state comprises:
specifying that a first energy generating unit of the at least one energy generating unit shall operate in motor mode.

12. The method of claim 1, wherein the selecting the respective second operational state comprises:
adjusting at least one yaw setting of the wind turbine.

13. The method of claim 1, wherein the selecting the respective second operational state comprises:
shutting down a first energy generating unit of the at least one energy generating unit.

14. The method of claim 1, further comprising:
performing, based on the adjusted at least one operational constraint and the difference in thrust, an optimization calculation for a total power production of the wind turbine,
wherein the selecting the respective second operational state is further based on the optimization calculation.

15. The method of claim 14, wherein performing the optimization calculation is performed using a model predictive control (MPC) algorithm.

16. The method of claim 14, wherein the performing the optimization calculation comprises consulting a database.

17. A wind turbine comprising:
a support structure;
a plurality of energy generating units mounted on the support structure, each of the plurality of energy generating units comprising:
  a rotor; and
  a set of wind turbine blades disposed on the rotor; and
a control system confirmed to perform an operation comprising:
  while each energy generating unit of the plurality of energy generating units operates in a respective first operational state of a plurality of predefined operational states:
    applying a respective first set of operational constraints defining limits for one or more operational parameters of the respective energy generating unit;
    detecting a difference in thrust acting on at least two energy generating units of the plurality of energy generating units;
    adjusting, for at least one energy generating unit of the plurality of energy generating units, at least one operational constraint of the respective first set of operational constraints in accordance with prevailing operating conditions and with the difference in thrust, wherein adjusting the at least one operational constraint allows the at least one energy generating unit to temporarily operation outside the limits for the one or more operational parameters, thereby increasing loads on the support structure of the wind turbine; and
    selecting, based on the adjusted at least one operational constraint, a respective second operational state of the plurality of predefined operational states for the at least one energy generating unit; and
  operating the at least one energy generating unit in the respective second operational state to thereby counteract the difference in thrust.

18. The wind turbine of claim 17, wherein the adjusting at least one operational constraint comprises:
adjusting a load constraint relating to the at least one energy generating unit.

19. The wind turbine of claim 17, wherein the adjusting at least one operational constraint comprises:
adjusting a load constraint relating to the support structure.

20. The wind turbine of claim 17, wherein the adjusting at least one operational constraint comprises:
adjusting a power production constraint relating to the at least one energy generating unit.

* * * * *